(12) United States Patent
Jarman et al.

(10) Patent No.: US 6,253,162 B1
(45) Date of Patent: Jun. 26, 2001

(54) METHOD OF IDENTIFYING FEATURES IN INDEXED DATA

(75) Inventors: Kristin H. Jarman; Don Simone Daly; Kevin K. Anderson; Karen L. Wahl, all of Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/288,758

(22) Filed: Apr. 7, 1999

(51) Int. Cl.$^7$ ...................................................... H01J 49/00
(52) U.S. Cl. ............................ 702/179; 702/69; 250/282; 340/541
(58) Field of Search ..................... 702/69, 179; 382/275, 382/254, 270; 356/336, 343; 340/541, 506, 511; 375/224; 358/464, 465; 250/282

(56) References Cited

U.S. PATENT DOCUMENTS

| 4,766,600 | * | 8/1988 | Martin | 375/224 |
| 5,440,119 | * | 8/1995 | Labowsky | 250/282 |

FOREIGN PATENT DOCUMENTS 197 27 897  *  2/1999  (DE) .

OTHER PUBLICATIONS

Bryant W F et al; "Data–Blocking cross–correlation peak detection in computerized gas chromatography–mass spectrometry"; Analytical Chemistry, US, American Chemical Society. Columbus. vol. 52, No. 1, pp. 38–43 1980.*

Malmoquist G et al; "Alignment of chromatographic profiles for principal fingerprinting methods"; journal of Chromatography A, NL, Elsvier science, vol. 687, No. 1, Sep. 12, 1994, pp. 71–88.*

* cited by examiner

Primary Examiner—Kamini Shah
(74) Attorney, Agent, or Firm—Woodard, Emhardt, Naughton, Moriarty & McNett

(57) ABSTRACT

The present invention is a method of identifying features in indexed data, especially useful for distinguishing signal from noise in data provided as a plurality of ordered pairs. Each of the plurality of ordered pairs has an index and a response. The method has the steps of: (a) providing an index window having a first window end located on a first index and extending across a plurality of indices to a second window end; (b) selecting responses corresponding to the plurality of indices within the index window and computing a measure of dispersion of the responses; and (c) comparing the measure of dispersion to a dispersion critical value. Advantages of the present invention include minimizing signal to noise ratio, signal drift, varying baseline signal and combinations thereof.

10 Claims, 4 Drawing Sheets

METHOD OF IDENTIFYING FEATURES IN INDEXED DATA

This invention was made with Government support under Contract DE-AC0676RLO1830 awarded by the U.S. Department of Energy. The Government has certain rights in the invention.

FIELD OF THE INVENTION

The present invention is a method of identifying and/or characterizing features in indexed data. The present invention is especially useful for identifying and extracting features in spectral data, for example distinguishing signal from noise.

As used herein, the term "indexed data" refers to a set of measured values called responses. Each response is related to one or more of its neighbor element(s). The relationship may be, for example, categorical, spatial or temporal and may be explicitly stated or implicitly understood from knowing the type of response data and/or how the response data were obtained. When a unique index is assigned to each response, the data are considered indexed. The unique index may be one dimensional or multi-dimensional. One dimensional indexed data may be defined as data in ordered pairs (index value, response), where the index values represent values of a physical parameter such as time, distance, frequency, or category, and the response may include but is not limited to a signal intensity, particle or item count, or concentration measurement. An example of a multi-dimensional indexed dataset is a matrix having a unique row and column address for each response.

BACKGROUND OF THE INVENTION

The identification and/or characterization of significant or useful features is a classic problem in the analysis of indexed data. Often this problem is reduced to separating the desired signal from undesired noise. Transient features, specifically peaks are frequently of interest. For indexed data, a peak appears as a deviation, for example a rise and fall, in the responses over consecutive indices. However, the appearance of background noise can also result in a deviation of responses for indexed data.

Traditionally, peak detection based upon rejecting responses below a threshold value has been used. Whether manual or automated, selection of a threshold is still an art, requiring arbitrary and subjective operator/analyst-dependent decision making. The effectiveness of traditional peak detection is affected by signal to noise ratio, signal drift, and varying baseline signal. Consequently, an operator or analyst may have to apply several thresholds to the responses over different regions of indices to capture as much signal as possible, which is difficult to reproduce, suffers from substantial signal loss, and is subject to operator/analyst uncertainty.

For example, in developing statistical analysis methods for MALDI-MS (matrix-assisted laser desorption/ionization—mass spectrometry), current peak detection and characterization algorithms are inadequate. The MALDI-MS process begins with an analyte of interest placed on a sample plate and mixed with a matrix. The matrix is a compound chosen to absorb light of wavelengths emitted by a given laser. Laser light is then directed at the sample and the matrix absorbs the light energy, becoming ionized. The ionization of the matrix results in subsequent ionization of the analyte as analyte ions 100 (FIG. 1). A charge is applied at the detector 104 that attracts the analyte ions 100 through a flight tube 102 to the detector 104. The detector 104 measures the abundance of ions that arrive in short time intervals. The abundance of ions over time is converted to the abundance of ions as a function of mass/charge (m/z) ratio. The ions 100 arrive at the detector 104 in a disperse packet which spans multiple sampling intervals of the detector 104. As a result, the ions 100 are binned so that the are counted over several m/z units as illustrated in FIG. 2. Current algorithms require the user to specify a detection threshold 200; only peaks 202 exceeding this threshold will be detected and characterized. The detection threshold procedure is conceptually appealing and suggests that m/z values for which no ions are present will read zero relative abundance, while m/z values for which ions are present will result in a peak. The list of MALDI-MS peaks produced by the instrument depends on how a given user sets the detection threshold 200 on any given day. This required human intervention makes complete automation impossible and induces variability that makes accurate statistical characterization of MALDI-MS spectra difficult.

Operator, instrumental and experimental uncertainty add noise to the MALDI-MS spectra, decreasing even further the effectiveness of current peak detection algorithms. If the user-defined threshold 200 is set too low, noise can erroneously be characterized as a peak. However, if the user-defined threshold 200 is set too high, small peaks might be erroneously identified as noise.

Related to the problem of distinguishing signal from noise is bounding uncertainty of the signal. It is well known that replicate analyses of a sample often produce slightly different indexed data.

Thus, there is a need in the art of indexed data collection and analysis for a method of processing indexed data that provides greater confidence in identification/characterization of spectral feature(s), and/or greater confidence in separating signal from noise with less signal loss that is robust and minimizes the adverse effects of low signal to noise ratio, signal drift, varying baseline signal and combinations thereof. In addition, there is a need for a method for characterizing multi-dimensional uncertainty of the signal.

SUMMARY OF THE INVENTION

The present invention is a method of identifying features in indexed data that is fundamentally distinct from prior methods. Whereas prior methods focused on comparing the responses to a response threshold, the present invention uses the responses in combination with the indices. More specifically, the present invention considers responses as a histogram of the indices, and uses this histogram concept to construct a measure of dispersion of the indices. The responses associated with each of the indices are used as histogram frequencies in measuring dispersion of indices. Comparison of the index dispersion to a dispersion critical value provides the determination of significant or useful feature(s). Thus, the method of the present invention has the steps of (a) selecting a subset of indices having a beginning index and an ending index;

(b) computing a measure of dispersion of the subset of indices using a subset of responses corresponding to the subset of indices as histogram frequencies; and (c) comparing the measure of dispersion to a dispersion critical value.

In the example of MALDI mass spectrometry, the index values are mass/charge ratios and the responses are corresponding intensities. Each index value represents the physical measurement of mass/charge ratio, and its corresponding intensity measurement represents the relative abundance of ions observed at that mass/charge ratio. A MALDI-MS spectrum can then be thought of as a histogram of mass/ charge ratios (i.e. the relative abundance of ions as a function of mass/charge ratio).

From this histogram concept, features can be identified and characterized by comparing properties of the histogram to the corresponding properties for a hypothesized noise only distribution. In a preferred embodiment of this invention, dispersion is used as a criteria for distinguishing spectral features due to signal from spectral features due to noise. In particular, when only noise is present, the dispersion of index values in some small, consecutive region of the data should reflect the dispersion of a Uniform distribution, where the relative abundance of each index value is expected to be constant over the region of interest. On the other hand, when a feature due to signal is present, the dispersion of index values in a small region of the data will be significantly different from the dispersion due to a Uniform distribution. Once a feature has been identified, it is characterized in a similar manner using various measures of statistical moments of the index values.

It is, therefore, an object of the present invention to provide a method of identifying features in indexed data using a measure of dispersion of the index.

Advantages of the present invention include minimizing the effects of signal to noise ratio, signal drift, varying baseline signal and combinations thereof. In addition, the present invention facilitates automation of data reduction by minimizing or eliminating the need for user selection of a threshold.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 7b shows peaks from a second MALDI-MS run on the same bacteriological sample as used for FIG. 7a.

FIG. 7c shows peaks from a third MALDI-MS run on the same bacteriological sample as used for FIG. 7a.

DESCRIPTION OF THE PREFERRED EMBODIMENT(S)

Figure 1:
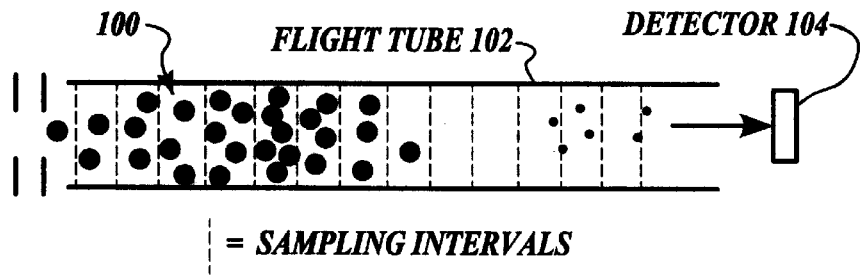
FIG. 1 is a cross section of a MALDI-MS instrument (Prior Art).
Figure 2:
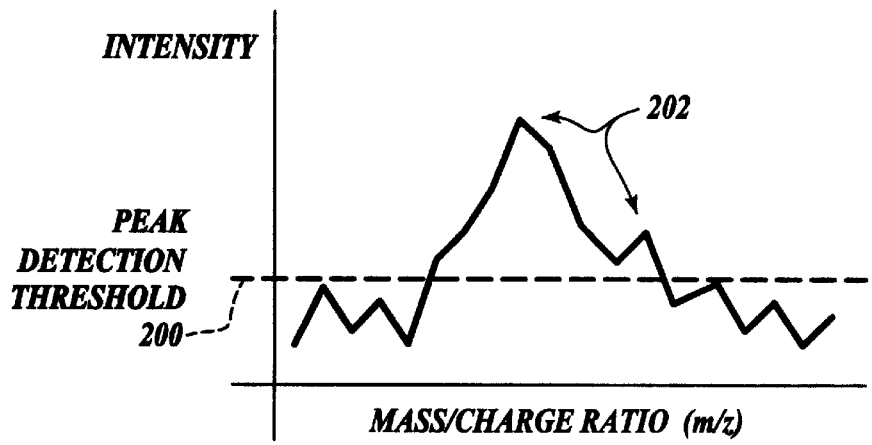
FIG. 2 is a MALDI-MS spectrum of intensity versus mass/charge ratio with a peak detection threshold (prior art).

The present invention is a method of identifying features in indexed data, as may be provided by spectral data obtained from a process including but not limited to mass spectrometry (MS); gas chromatography; and nuclear magnetic resonance, Auger, and/or infrared and RAMAN spectroscopy. The present invention also applies to other forms of data including, but not limited to numerical transforms of data such as Fourier and wavelet transforms; time series data such as financial stock or bond market time series; acoustic transducer or other sensor output; and automobile traffic monitoring or other counting processes.

The index may be a physical parameter including but not limited to time, distance, frequency, location; an identifier parameter for example demographic data, index number and combinations thereof. Indexed data includes but is not limited to sets of ordered pairs (index, response). Indexed data includes data from multi-dimensional analyses including but not limited to two dimensional mass spectrometry (MS—MS), two dimensional gas chromatography (GC—GC), two dimensional Fourier transforms, and combinations thereof.

An especially useful application of the present invention is the determination or identification/characterization of spectral peaks. In this application, peaks are extracted from the noise in a fully automated, objective manner minimizing peaks missed due to relatively small signal intensity.

Peaks are extracted by calculating a measure of index dispersion at each index value using a moving window method. That is, for each index value in turn, a measure of index dispersion is calculated using a contiguous subset or window of neighboring indices and their corresponding responses. In a preferred embodiment of this invention, a measure of index dispersion is calculated for a window centered on each index value. However, it is also within the scope of this invention that a measure of index dispersion be calculated for fewer index values, such as every third or fifth index value. It is preferred that the window be of a width of the signal peak. The width of the window may vary depending on the properties of the features of interest.

The measure of dispersion is a moment estimate including but not limited to variance, mean squared error, skewness, kurtosis, absolute deviation, trimmed, weighted, and combinations thereof.

Spectral peaks are recognized or identified by dispersion values above or below (depending upon the reference datum and the measure of dispersion a chosen) the dispersion critical value. Thus, noise may be separated from signal inasmuch as noise has a dispersion that is above the dispersion critical value. In preferred operation with hundreds to thousands of data points, a peak is preferably identified using the ratio of indexed dispersion measures to the expected dispersion measure for a Uniform distribution. More specifically, a peak is determined to be where consecutive ratios fall below the dispersion critical value, that is a plurality of weighted measures below the dispersion critical value. The dispersion critical value may be chosen using a variety of methods. Such methods include but are not limited to a priori selection by the user, as a constant for all datasets, or statistical techniques based on characterizing the dispersion distribution and constructing a critical value for whether or not a peak is present. In a preferred embodiment, the dispersion critical value is determined by the noise levels of the dataset, and the variation of the dispersion measure over windows where no peaks are present. In particular, the dispersion critical value is determined for each dataset in an automated fashion as follows. The variation in dispersion a is characterized using a robust estimate of the variance of dispersion measures across all windows. Robust estimation is used so the estimated variance of the dispersion will not be influenced by peaks. The dispersion critical value is determined to be 1-kσ, where k is a positive number, usually 2.5 or 3. Consecutive ratios of index dispersion to dispersion for a Uniform distribution that fall below 1-kσ are determined as containing a peak. This approach is insensitive to signal to noise ratio, signal drift, varying baseline signal and combinations thereof.

Figure 3:
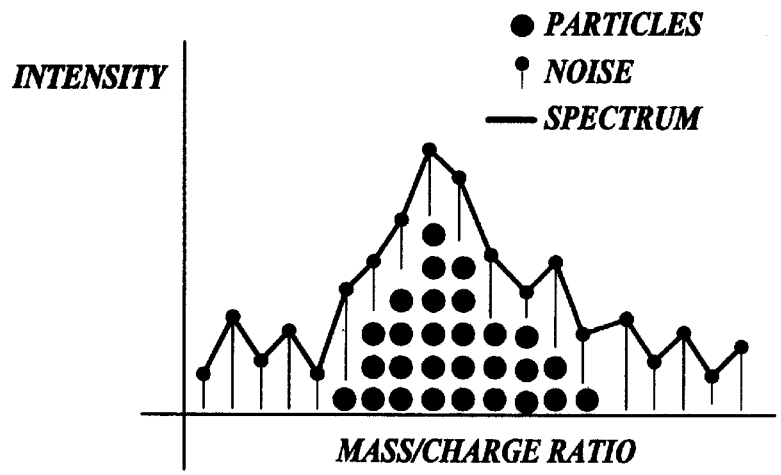
FIG. 3 is a histogram of intensity at various mass/charge ratios according to the present invention.

Illustrative, but not limiting, of the present invention is an application for MALDI-MS peaks. The model for MALDI-MS peaks begins after ionization of the matrix and analyte by the laser. The concept of the present invention is applied by considering a packet of ions being dispersed according to some probability distribution where most of the ions are tightly clustered near the center. The abundance of ions will be tightly concentrated around the m/z value of the ion packet, resulting in a peak. Because the ions in a packet are dispersed randomly, the number of m/z values over which the packet is spread (i.e. the width of a peak) is also a random variable that depends on the detector properties of the instrument. The width of the peak, the shape or type of distribution, as well as peak height all contribute to characterization of any given peak. Thus, instead of simply considering peak height as in a traditional threshold detection methods, the present invention obtains a measure of dispersion for the indices using the peak height as a weight. Therefore, the abundance of ions (responses) recorded by the detector versus time (index) can be thought of as a histogram FIG. 3 (the relative number of particles of m/z unit as a function of m/z unit) from which a measure of dispersion may be obtained. The particle contribution for each m/z value is a Poisson random variable, whereas the noise contribution is a combination of chemical noise (a Poisson random variable) and thermoelectric (Johnson) noise (a normal random variable).

In operation, a window is positioned on the spectrum. The window has a small range of consecutive index values (e.g. m/z values) having corresponding measured responses (e.g. intensity). If no peak is present in a window, then the distribution of quantities will be relatively flat over the window indicating that particles are arriving uniformly and randomly and so only noise is present. In this case, particles arriving at the detector have a Uniform distibution. By modeling of a MALDI spectrum as a histogram, the dispersion may be a variance of m/z values inside this window computed by $$Variance = \sum_{k \in window} \frac{I_k(m_k - \mu)^2}{\sum_{j \in window} I_j}$$

where $I_k$ is the intensity of the spectrum at point k, $m_k$ is the m/z value of point k, and $\mu$ is the center m/z value in the window. When no peak is present, this variance should be the same as the variance of a uniform distribution. If, on the other hand, a peak is present in the window, particles will be highly concentrated is around the m/z value of the ion packet In this case, the variance of the m/z values inside the window will be smaller than the variance of a uniform distribution (because particles are more tightly clustered at the center of the window rather than evenly dispersed throughout the window).

As one skilled in the art will understand, the present invention is not limited to detection and characterization of features using the dispersion as given in (1). In particular, robust measures of dispersion such as the absolute deviation may be used. In addition, other characteristics for features of interest may be used to detect features including but not limited to the centroid, and third or higher moments, or robust estimates of the same.

This observation provides the basis for a peak detection and characterization algorithm. In particular, a window containing a small range of m/z values is generated and the variance of the m/z values inside the window is computed. The computed variance is divided by the corresponding variance for a uniform distribution. If this variance ratio is significantly smaller than one, then the algorithm determines that a peak is present in the window. The window is then moved a little to the right or left, and the process is repeated. When no peak is present, the variance ratio is near one. As a peak enters the window, the variance ratio increases because of a high concentration of m/z values at the extreme end of the window. As the peak moves through the center of the window, the variance drops below a critical threshold indicating that the variance is significantly smaller than expected for a uniform distribution. Finally, as the peak leaves the window, the variance ratio again increases because of the high concentration of m/z values at the lower extreme end of the window.

Once the peaks have been detected, all that remains is to estimate the peak features such as height and location. In practice, peak location is typically estimated using the centroid. In the method of the present invention, the centroid is simply the average of all the indices (e.g. m/z values). Because the centroid can be adversely affected by nonsymmetric peak shapes, it is preferred to use is only values close to the center of the peak to estimate the peak location. Eliminating points at the tails of a histogram is called trimming in statistics, and can produce highly robust, reproducible results, and is therefore preferred in the present invention. Peak height is typically estimated using either the maximum intensity or the area under the peak. Using the maximum intensity results in a peak height that is sensitive to noise, and doesn't necessarily reflect the relative number of ions present of a given m/z value. On the other hand, area under the peak better reflects the relative number of ions present but can be sensitive to skewed peaks. For the present invention, it is preferred to construct two estimates for the peak height: (1) a smoothed maximum intensity, and (2) a trimmed area under the peak. In using a smoothed maximum intensity for peak height, sensitivity to noise will be reduced through weighted averaging of intensities close to the peak center. By using a trimmed area under the peak, sensitivity to skewed peaks will be reduced.

EXAMPLE 1

Figure 4:
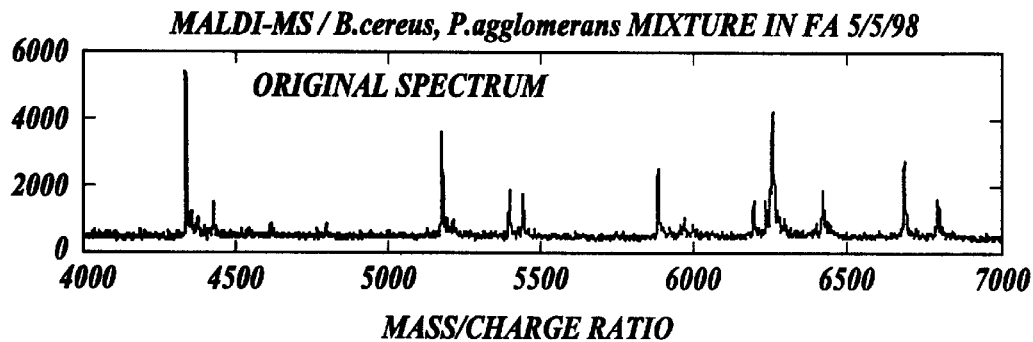
FIG. 4 is a MALDI-MS spectrum of a mixture of microorganisms (Example 1).
Figure 5:
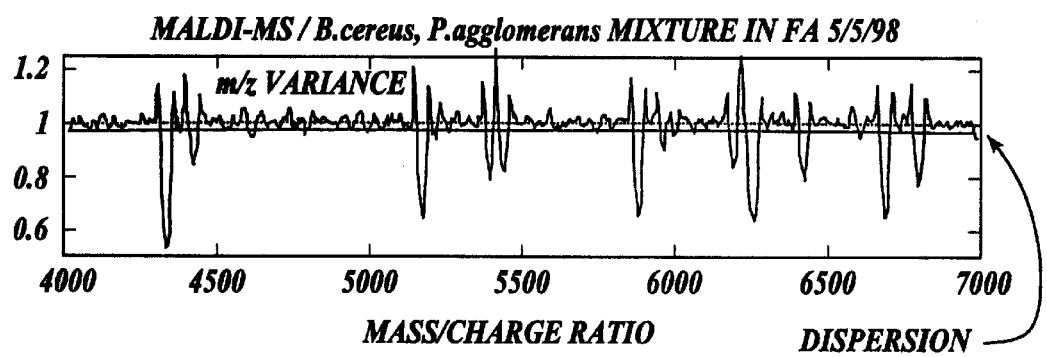
FIG. 5 is a measure of dispersion for the spectrum of FIG. 4 together with a dispersion critical value.
Figure 6:
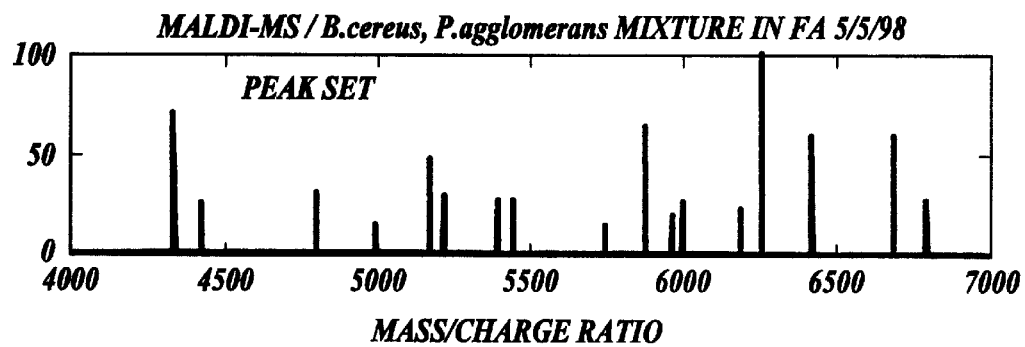
FIG. 6 is a graph of the peaks identified from the method of the present invention.
Figure 7A:
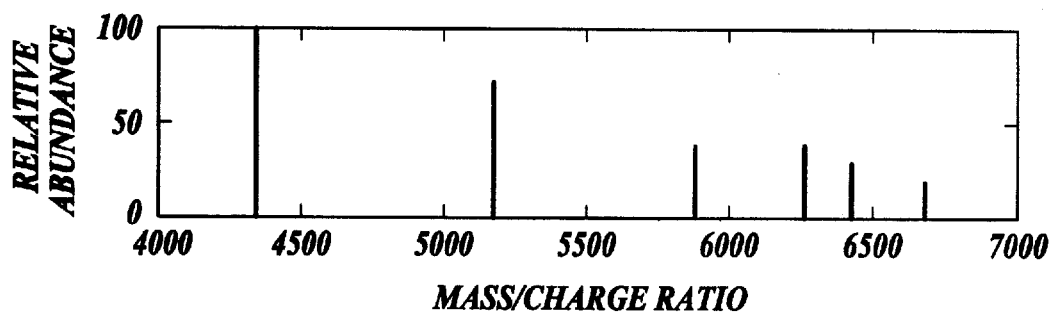
FIG. 7a shows peaks from a first MALDI-MS run on a bacteriological sample.
Figure 7B:
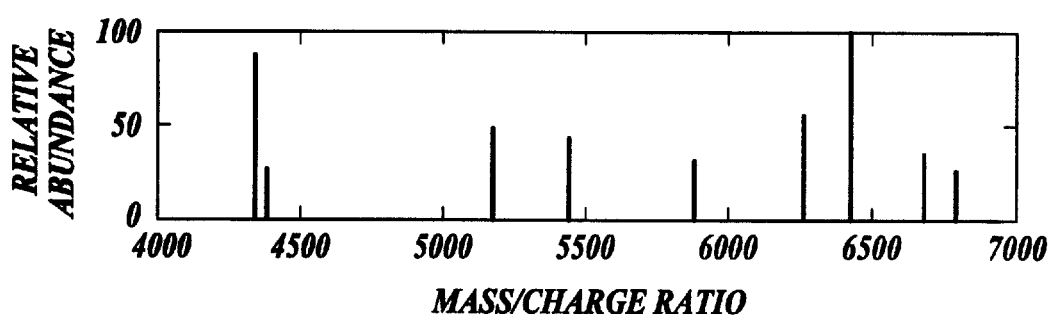
Figure 7C:
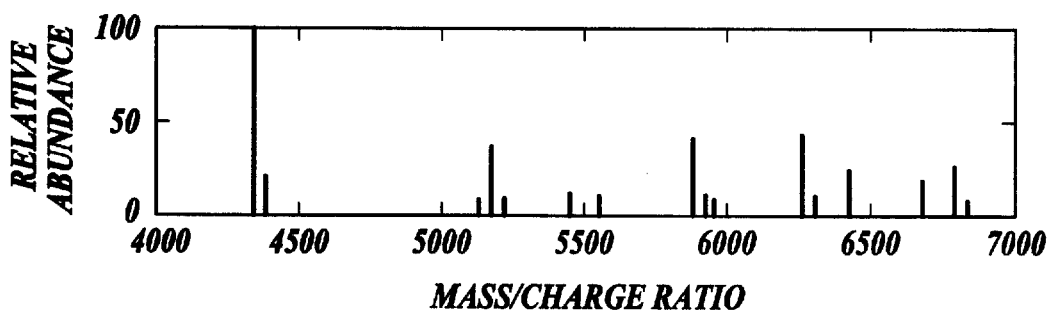

An experiment was conducted to demonstrate the utility of the present invention. FIG. 4 displays a raw MALDI mass spectrum for a mixture of Bacillus cereus and Pantoea agglomerans. FIG. 5 displays the measure of index dispersion for all windows over the entire spectrum. The straight line at approximately 0.98 represents the dispersion critical threshold. Any plurality of measures of index dispersion that drop below this threshold represent an area where a peak is identified. FIG. 6 displays the peaks selected by this algorithm, where peak height was estimated as the area under the peak and peak location was estimated using the trimmed mean.

REPLICATE DATA SETS

Another aspect of the present invention is especially useful for analyzing at least two replicate data sets for a sample. From replicate data sets are obtained (1) an estimate of expected value of the response and (2) an estimate of expected value of the index. Uncertainty or variance of the data from the at least two replicates for both the index value and the measured response are also obtained. Displaying the estimate of expected value and the estimate of uncertainty together greatly facilitates the analysts understanding of the replicate data and relationships therebetween.

In particular, a vertical bar of length corresponding to the expected value of the response is placed at each expected value of the index corresponding to the response. In addition, an uncertainty region centered at the top of each vertical bar represents the joint uncertainty in the estimated peak location and height. For each peak, the size and shape of the uncertainty region depends on the underlying stochastic nature of the spectra being visualized and the intended usage of the resulting plot. The display resembles a collection of irregularly-spaced and various sized lollipops standing on end along the horizontal axis of the display.

A preferred embodiment uses an average of the replicates, and uncertainty regions that enclose a majority of variation in the replicate spectra. More specifically, the uncertainty region for each spectral peak is may be constructed independently and may envelope up to 95% of the peak location and height derived from the standard deviation of the replicate peak heights and locations, and assuming normality. Therefore, by examining the size of the uncertainty regions, an analyst can visualize how much the replicates vary from one to the next, an important consideration in determining reproducibility.

It will be understood by those of skill in the art that different statistical estimates of uncertainty may be used. In particular, rather than visualizing the 95% variation region of peak heights and locations, confidence intervals may be used to visualize the accuracy of the estimated peak heights and locations. The uncertainty intervals may take peak height and location into account independently, or a joint uncertainty region incorporating both may be used. Statistical correlation between peak height and location may be incorporated into the uncertainty intervals. Finally, the uncertainty in the presence of the replicate peaks may be visualized by displaying, at the base of each peak, the fraction of replicates where the peak appeared.

EXAMPLE 2

Figure 8:
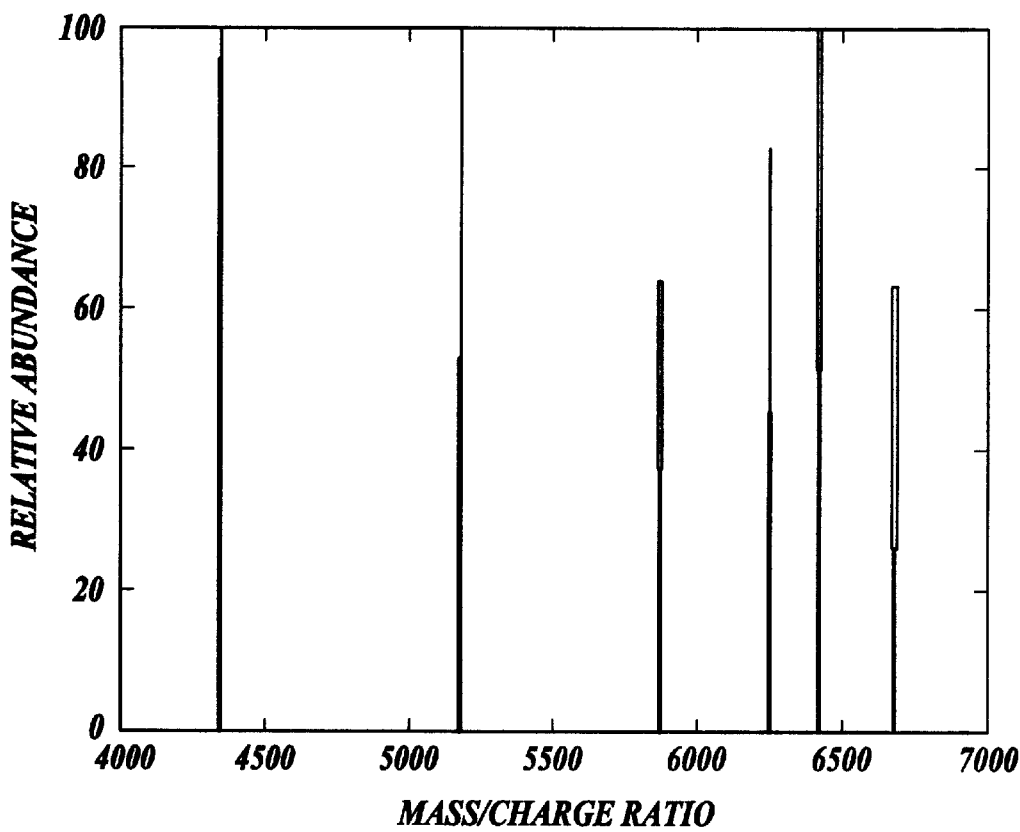
FIG. 8 shows peaks as a composite average of the peaks from FIGS. 7a, 7b, and 7c together with uncertainty regions centered at the tops of the vertical bars (lollipop plot).

Peaks were identified in three replicate MALDI mass spectra of *Bacillus cereus* according to the procedure of Example 1 and are displayed in FIG.'s 7a, 7b and 7c. The relative peak heights (responses) and locations (indices) for replicate peaks between 6000–7000 m/z units are averaged and plotted in FIG. 8. In addition, using the assumption that peaks heights and locations are independent and normally distributed, a 95% variation interval for peak height and location is estimated using a t-distribution and the standard deviation of each peak's relative height and location. The uncertainty region is then displayed as a rectangle centered a top of its respective peak estimate. The peak estimates of 95% of all replicates collected under similar conditions are expected to appear within the uncertainty region.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of identifying a feature in indexed data of responses, comprising the steps of:

(a) selecting a subset of indices having a beginning index and ending index;

(b) computing a measure of dispersion of said subset of indices using a subset of said responses corresponding to said subset of indices as histogram frequencies; and (c) comparing said measure of dispersion to dispersion critical value;

wherein said dispersion critical value exceeds a background level of dispersion.

2. The method as recited in claim 1, wherein said beginning index and said ending index are advanced at least one index for computing a second measure of dispersion.

3. The method as recited in claim 2, wherein said dispersion critical value exceeds a background level of dispersion.

4. The method as recited in claim 3, wherein a noise is identified as data corresponding to weighted measure above said dispersion critical value and a signal is identified as data corresponding to weighted measure below said dispersion critical value.

5. The method as recited in claim 4, wherein said weighted measure below said dispersion critical value is a plurality of weighted measures having consecutive indices.

6. The method as recited in claim 1 repeated for at least two replicate data sets for a sample.

7. The method as recited in claim 6, further comprising the steps of obtaining an estimate of expected value and an estimate of uncertainty of the data from said at least two replicates for both the index and the response corresponding thereto.

8. The method as recited in claim 7, further comprising displaying said estimate of expected value and said estimate of uncertainty together.

9. The method as recited in claim 1, wherein said data is selected from the group consisting of spectral data, chromatographic data, time series data, and combinations thereof.

10. The method as recited in claim 1, further comprising computing a weighted statistic of the index for characterizing said feature.

* * * * *